Patented Nov. 9, 1943

2,333,955

UNITED STATES PATENT OFFICE 2,333,955

YEAST CULTURE

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application April 9, 1940,
Serial No. 328,694

2 Claims. (Cl. 195—82)

The invention relates to a method for promoting growth of yeast. More particularly, it pertains to a procedure which brings about an effective utilization of the nitrogen content of a nutriment, and includes correlated improvements and discoveries whereby propagation of yeast is enhanced.

An object of the invention is to provide a method whereby a growth promoting factor deficiency in a medium for propagation of yeast may be corrected.

A further object of the invention is to provide a procedure in accordance with which an effective utilization of the nitrogen content of carbamid by yeast may be accomplished.

An additional object of the invention is the provision of a method which enables yeast fully to assimilate the nitrogen content of carbamid and in a manner that may be readily, economically and efficiently practiced to a desired extent.

A specific object of the invention is the provision of a method for growing yeast in a medium containing carbamid as the nitrogen nutriment but deficient in growth promoting factor $II_B$ by incorporating said factor thereinto in an amount which obviates such deficiency.

Other objects of the invention will in part be obvious and will in part appear hereinafter.

The invention accordingly comprises the several steps and the relation of one or more of such steps with respect to each of the others thereof, which will be exemplified in the process hereinafter disclosed; and the scope of the invention will be indicated in the claims.

Our studies relative to bios requirements of yeast have facilitated consideration of the nitrogen metabolism thereof. We have found that synthetic or highly purified bios materials having an insignificant quantity of assimilable nitrogen are utilizable in a medium which otherwise is synthetic, and that the growth obtained thereby will be directly proportional to the amount of easily assimilable nitrogen present, for example, ammonium sulfate. However, the non-availability of nitrogen in other types of nitrogen containing materials is evidenced by the absence of a significant growth.

In these studies we have found that growth promoting factor $II_B$ is uniquely associated with nitrogen metabolism. A Saccharomyces cerevisiae yeast gave a poor yield or growth when carbamid was used as the nitrogen source as compared with ammonium sulfate. An investigation disclosed that the yield was increased and a normal crop obtained with carbamid nitrogen when the amount of $II_B$ was increased. This evidences, hence, that a medium containing carbamid as a nitrogen source and deficient in $II_B$, whereby full utilization of the nitrogen is not obtained, may be brought to a condition to give a full yield corresponding to the nitrogen present when an amount of $II_B$ is added in order to make up the deficiency.

In the practice of the invention a medium, i. e., a wort or spirit mash containing a yeast assimilable carbohydrate and carbamid as a nitrogen source, may be prepared and an amount of growth promoting factor $II_B$ incorporated therewith. The medium may then be inoculated with yeast and the yeast permitted to grow or propagate therein under suitable temperature conditions as, for example, about 30° C. After a suitable period of time the yeast may be separated and the amount thereof determined, thus showing the influence of the factor $II_B$ upon the yield or growth. A wort prepared in the usual manner, especially a synthetic wort, has been found to be deficient in factor $II_B$ and not to give a full yield with commensurate nitrogen utilization when carbamid is employed as the nitrogen nutriment. However, when $II_B$ in the form of a concentrate, the pure substance being not known, is incorporated into such a wort in an amount sufficient to make up the deficiency, there is a complete utilization of the nitrogen content of the carbamid with an accompanying normal yield or crop of the yeast.

As a yeast utilization may be made of the Saccharomyces cerevisiae, and more particularly numbers 765, 2335, 4125 and 4225 of the American type culture collection, Strain Delft I, Centraalbureau voor Schimmel cultures and Luft II, Rasse XII, and Spc. 152 of the Institut für Gärungsgewerbe.

As illustrative of a manner in which the invention may be practiced, the following procedure is presented. The effect of growth promoting factor $II_B$ upon the nitrogen metabolism of yeast when employing carbamid as a nitrogen source may be shown by preparing a medium containing dextrose, preferably chemically pure, a buffer-salt combination giving in solution a pH value of 5.0 to 5.5, inorganic salts as potassium, magnesium, calcium and sodium salts, inositol, and $II_A$ or beta alanine. In addition thereto $II_B$ in solution is incorporated therewith. This medium may then be placed in suitable vessels, as a 200 ml. conical flask in an amount of 30 ml., and inoculated with 1 mg. of moist yeast. The medium containing yeast is then maintained at a temperature of about 30° C. with active shaking for a period which may be about 24 hours. At the end of this period from 1 to 2 ml. of the yeast suspension may be removed and have added thereto 2 ml. of a 10% solution of chloracetic acid. After standing for about 5 minutes the volume is made up to about 10 ml. and centrifuged in Hopkins vaccine tubes. After about 5 minutes centrifuging at high speed, the volume of yeast sediment is read. The yield or crop values are calculated by taking the yeast volume equivalent to 10 ml. of yeast suspension and multiplying by 1000. By this determination 1 gram of moist yeast in the 30 ml. total volume of growth medium gives a crop value of 222. The buffer solution, for example, may be prepared by dissolving potassium citrate and citric acid in water in suitable proportions to give a volume of 1 liter.

It was thus shown that when IIB was added to a growth medium without any added nitrogen source there was substantially no influence upon the growth as shown by a crop value of 3. However, when the growth medium contained 1 gram carbamid and 1 ml. of IIB solution, the crop value was 150. Further, when the amount of IIB solution was doubled, i. e., when 2.0 ml. were added, the crop value was 200. This evidences a marked increase in crop value through the addition of a larger amount of the IIB solution, i. e., the IIB factor was that which limited the crop value when carbamid was included as the nitrogen nutriment. Moreover, it is thus shown that whereas the carbamid nitrogen was not fully utilized in the first instance due to a deficiency of IIB, there was such a utilization when this deficiency was corrected through the incorporation of a larger quantity of the factor IIB. A like series of studies showed that with ammonium sulfate as the nitrogen source there is not a like action of the factor IIB.

The comparative effects of growth promoting factors IIA or inositol, and IIB are evidenced also in the following tabulation. The yeast was grown in the manner heretofore set forth with a variation in the medium content only with respect to IIA and IIB.

| Nitrogen source | IIA solution | IIB solution | Crop |
|---|---|---|---|
| | Milliliters | Milliliters | |
| Carbamide | 1 | 1.0 | 150 |
| Do | 1 | 0.8 | 90 |
| Do | 1 | 0.4 | 60 |
| Do | 1 | 0.2 | 30 |
| Ammonium sulfate | 1 | 1.0 | 230 |
| Do | 1 | 0.8 | 210 |
| Do | 1 | 0.4 | 165 |
| Do | 1 | 0.2 | 85 |

The foregoing depicts that factor IIB is uniquely associated with nitrogen metabolism of yeast when carbamid constitutes the nitrogen source. It is thus demonstrated also that utilization of nitrogen from carbamid requires more IIB but less of the factor IIA than does an analogous crop when using ammonia nitrogen, i. e., ammonium sulfate. As will be observed a low amount of IIB more sharply reduces the carbamid crop than it does the ammonia crop.

The effect of factor IIB may be illustrated also by preparing a wort containing carbamid, corn sugar, potassium, magnesium, calcium and sodium salts, inoculating with yeast and permitting the yeast to grow therein at a temperature of about 30° C., and in the manner hereinbefore described. Without any addition of factor IIB the yield of yeast as moist yeast containing 27% solids and based upon the amount of molasses equivalent to the corn sugar used was 11%. When 50 cc. of about a 9° Balling IIB solution was introduced the yield was 70%. In the first instance, due to factor IIB deficiency, the yeast was not able to utilize the nitrogen present in the carbamid, although the amount employed was sufficient in nitrogen content to give a normal yield of the yeast, as is shown by the low yield obtained, whereas in the second, when such deficiency had been obviated, the yield was a normal one.

We accordingly have found that the nitrogen metabolism of yeast when using carbamid as a nitrogen source is distinctly associated with and influenced by growth promoting factor IIB so that a medium giving a low yield of yeast with carbamid as the nitrogen source, and being deficient in growth promoting factor IIB may be brought to a full utilization of the nitrogen content with attending increased yield of yeast by incorporating factor IIB in an amount sufficient to overcome the deficiency. The factor IIB may be produced by an extraction of cane distillery slop with butyl alcohol, methyl isobutyl ketone or ethyl ether at a pH which is acid to Congo red. The preparation may also be brought about by concentrating molasses slop to 40° Balling and precipitating salts by the addition of alcohol in an amount of about 80%. The alcohol is then evaporated; the residue taken up with water, and an activated carbon introduced thereinto at a pH acid to Congo red. The activated carbon adsorbs the factor IIB and this factor may be separated therefrom by elutriation with alcohol. Following distillation of the alcohol, the concentrated IIB residue may be extracted with ethyl ether or methyl isobutyl ketone and the IIB obtained therefrom by washing with water.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A method for promoting growth of yeast, which comprises incorporating growth promoting factor IIB into a wort containing a Saccharomyces cerevisiae yeast and carbamid as a nitrogen source, in an amount sufficient to bring about an efficient utilization of the carbamid nitrogen; said amount of factor IIB being in excess of that required to give an efficient utilization of ammonia nitrogen.

2. A method for promoting growth of yeast, which comprises propagating a Saccharomyces cerevisiae yeast in a medium containing a yeast assimilable carbohydrate, carbamid as the nitrogen source, and growth promoting factor IIB in an amount sufficient to bring about an efficient utilization of the carbamid nitrogen; said amount of factor IIB being in excess of that required to give an efficient utilization of ammonia nitrogen.

ALFRED S. SCHULTZ.
LAWRENCE ATKIN.
CHARLES N. FREY.